H. M. RHODES.
SEED HARVESTING MACHINE.
APPLICATION FILED FEB. 3, 1917.
1,272,717.
Patented July 16, 1918.
2 SHEETS—SHEET 1.
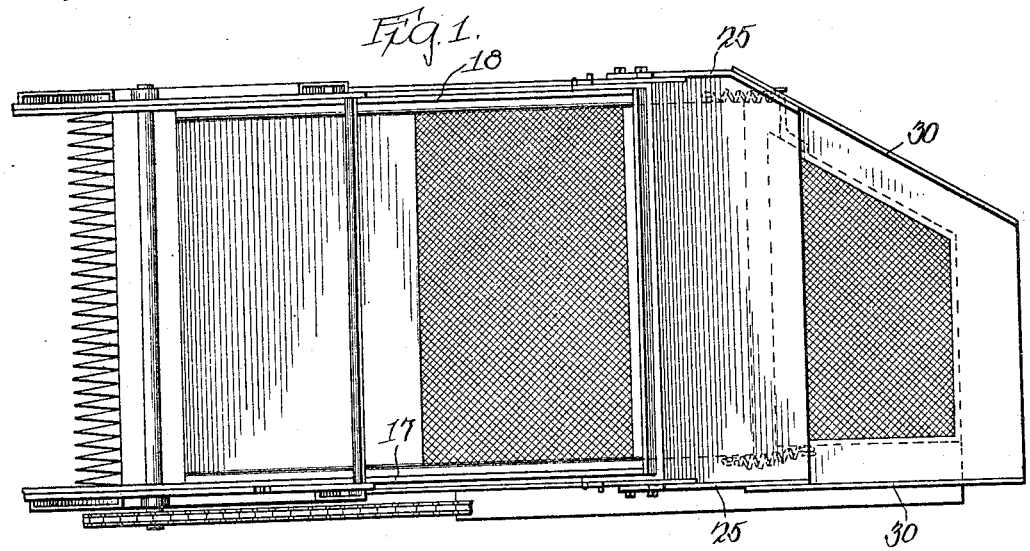
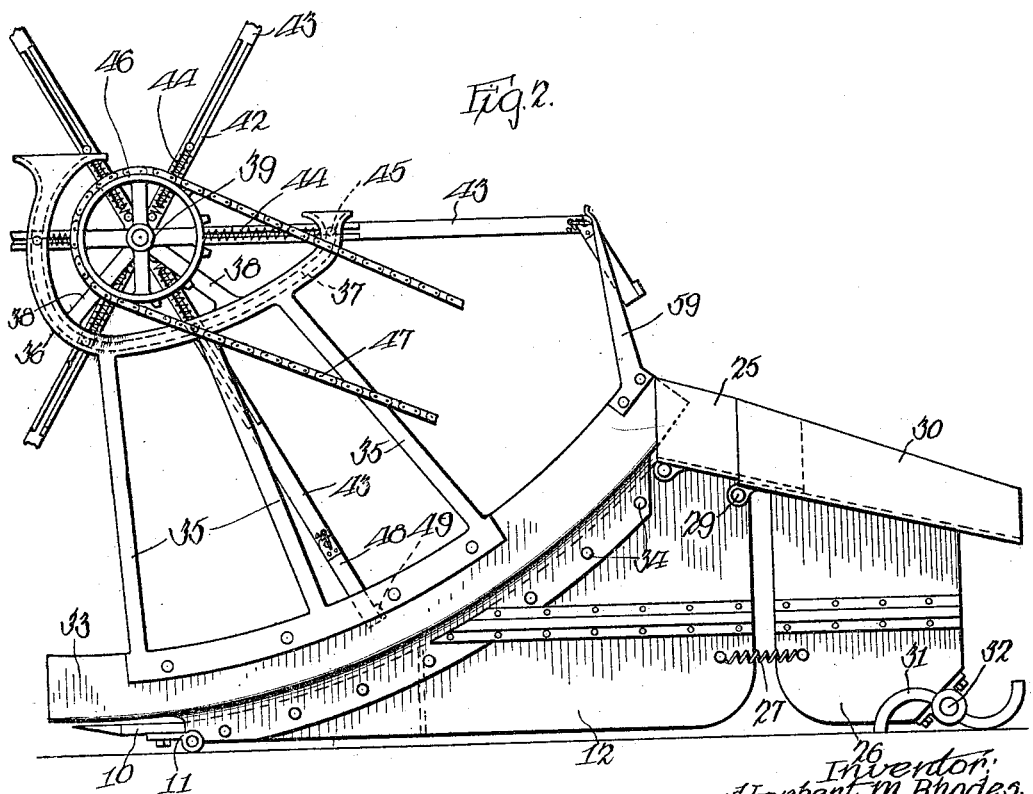
Inventor:
Herbert M. Rhodes.

H. M. RHODES.
SEED HARVESTING MACHINE.
APPLICATION FILED FEB. 3, 1917.
1,272,717.
Patented July 16, 1918.
2 SHEETS—SHEET 2.
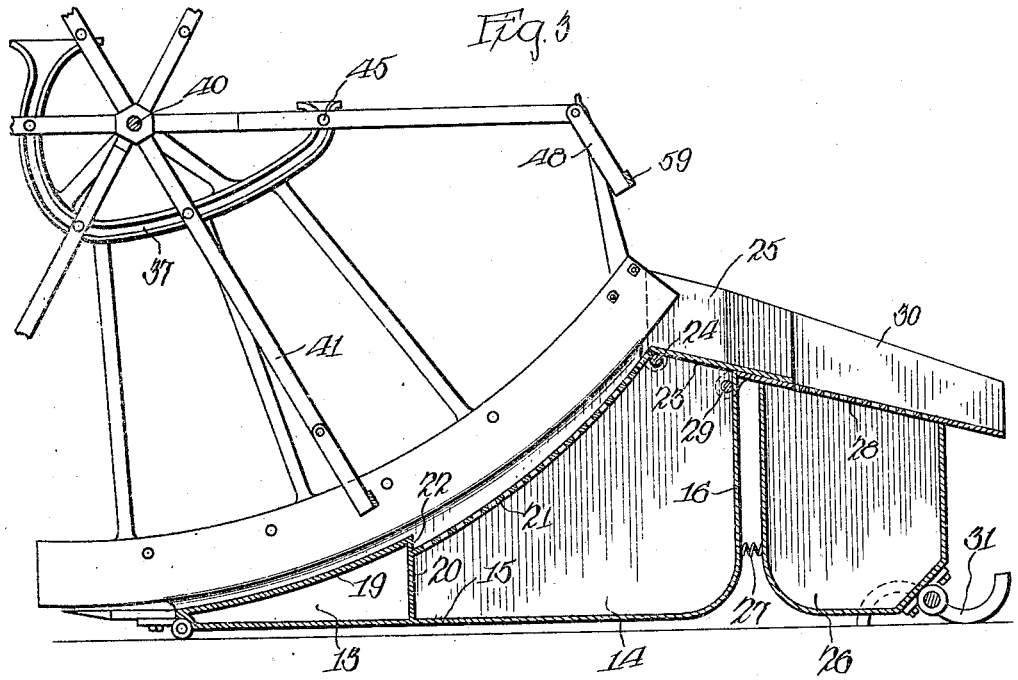
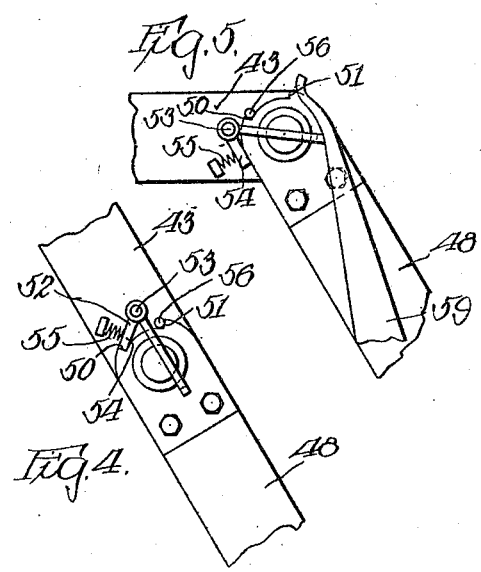
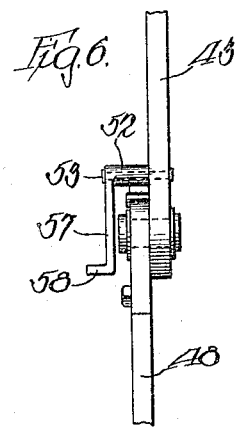
Inventor:
Herbert M. Rhodes,
by
Brown Nissen & Sprinkle
Attys.
Witness:

UNITED STATES PATENT OFFICE.

HERBERT M. RHODES, OF NATCHEZ, MISSISSIPPI.

SEED-HARVESTING MACHINE.

1,272,717.  Specification of Letters Patent.  Patented July 16, 1918.

Application filed February 3, 1917. Serial No. 146,348.

*To all whom it may concern:*

Be it known that I, HERBERT M. RHODES, a citizen of the United States, residing at Natchez, in the county of Adams and State of Mississippi, have invented certain new and useful Improvements in Seed-Harvesting Machines, of which the following is a specification.

This invention relates to a device for harvesting seed-bearing plants, such as clovers and small grains, and has for its object the provision of a device of the class named which shall be of improved construction and more efficient in operation than similar devices previously known.

The invention is exemplified in the combination and arrangement of parts shown in the accompanying drawings and described in the following specification, and it is more particularly pointed out in the appended claims.

In the drawings—

Figure 1 is a top plan view of a mower attachment embodying the present invention.

Fig. 2 is a side elevation of the device shown in Fig. 1.

Fig. 3 is a vertical sectional view on line 3—3 of Fig. 1; and

Figs. 4, 5 and 6 are details of one feature of construction embodied in the invention.

Referring to the drawings, the numeral 10 designates the sickle bar of a mowing machine, which may be of ordinary construction. Attached to the rear of the sickle bar, by means of a hinged pivot 11, is a receptacle 12, which, as shown in Fig. 3, comprises two compartments 13 and 14 respectively. The receptacle 12 is provided with a solid, preferably sheet metal bottom 15, which is bent upwardly at the rear to form a rear wall 16. The receptacle is inclosed on the sides by walls 17 and 18. The top of the forward chamber 13 is covered by a solid plate of sheet metal 19, which is curved upwardly and rearwardly to a partition 20, which separates the two compartments. A perforated cover plate 21 is placed over the major part of the compartment 14 and is slightly offset downwardly from the rear edge of the cover plate 19, as indicated at 22 in Fig. 3. The upper rear edge of the plate 21 is spaced slightly from the upper edge of the rear wall 16 to form an opening through which access may be had to the compartment 14. This opening is bridged by a trough or chute 23, hinged at 24 in such a manner that it covers the opening into the compartment 14, but may be raised to give access to this compartment. Upwardly extending side flanges 25 are arranged at each of the lateral edges of the trough 23. A second receptacle 26 is positioned in the rear of the parts described and is attached to the receptacle 12 by helical springs 27. A trough or chute 28 is hinged at 29 to the receptacle 12 and lies on the top of the receptacle 26 to form a cover therefor. The bottom of the trough 28 is perforated, as shown in Fig. 3, and the trough itself is provided with side plates 30 which inclose the end of the trough 23. A curved agitator bar 31 is journaled at 32 on the rear portion of the receptacle 26.

The side plates of the receptacle 12 are provided with upstanding flanges 33 which are curved to conform to the curvature of the cover plates of the receptacle and secured to the sides of the receptacle by rivets 34. Attached to the side plates 33 and extending upwardly therefrom, are a plurality of arms 35 which are connected at their upper ends by irregularly-shaped members 36, provided at their inner sides with cam grooves 37. Arms 38 extend upwardly from the members 36 and are connected at their upper ends to form a bearing 39 for a shaft 40. A reel 41 is secured to the shaft 40, the arms of which reel are made up of telescoping members 42 and 43. The sections 43 are normally drawn inwardly by springs 44, but are free to slide outwardly away from the shaft 40 to extend the length of the arms when tension is exerted upon the springs 44. Carried by each of the outer sections 43 of the reel arms is a cam roller 45 arranged to travel in the cam groove 37. The reel is rotated by a sprocket wheel 46 connected to the shaft 40, and driven by a sprocket chain 47, which may be in turn driven by a sprocket wheel connected with any suitable rotating part upon the mowing machine. Pivoted to the outer extremities of the sections 43 of the reel arms are extension members 48 to which the cross-slats 49 of the reel are attached. The rear portion of each extension 48, as shown in Figs. 4, 5 and 6, is provided with a pair of shoulders 50 and 51. A latch member 52 is pivotally mounted on a pin 53 secured to the section 43 of the reel arm, and one arm 54 of the latch member is arranged to bear against the shoulder 50 to hold the extension 48 in line with the section 43 of the reel arm. A spring 55 normally presses the latch into holding position. A pin 56 extends from the side of the section 43 and limits the swinging movement of the extension 48 about its pivot. The latch 52 carries a trip arm 57 having a laterally extending finger 58 arranged to coöperate with a trip stop 59 attached to the side flange 33, as shown in Fig. 2, this stop being arranged in the path of the finger 58 as the reel is rotated about its axis.

The operation of the device is as follows:

A mowing machine with the invention connected therewith is driven so that the sickle enters the standing grain or grass to be cut, and as the stalks are severed from the surface of the ground by the sickle they will fall upon the top plate 19 of the chamber 13. As the machine moves forwardly the reel 41 will be rotated upon its axis, and as will be seen from Fig. 2, the cam groove 37 is so shaped that the cross-slats 49 of the reel will be forced downwardly into a position near the surface of the ground at a point just in front of the sickle bar 10. By this arrangement the vegetation being cut will be carried into contact with the sickle, even though the plants may be bent over or lying upon the surface of the ground. As the reel continues to rotate, the cross-slats 49 will be caused by the cam groove 37 to follow the curvature of the cover plates 19 and 21, thus moving the severed stalks over the upper surface of these plates. If during this operation any seed is shattered from the stalks, it will be carried by the rearwardly moving straw over the surface of the plate 19 and deposited on the surface of the plate 21. The inclination of the plate 19 is not very great, so that there is little tendency of the seeds to resist the movement along this plate produced by the reel bars 49. As soon as the seeds however have passed the offset 22 they encounter a steeper inclination and will readily sift through the perforations in this plate. By the time the straw has reached the upper edge of the plate 21, a large percentage of the loose seeds intermingled therewith will have sifted through the perforated plate into the receptacle 12. It may happen, however, that some seeds still remain mixed with the straw and it is desirable to shake these seeds from the straw before the straw is finally deposited upon the ground. This is done during the passage of the straw over the perforated plate 28 which covers the receptacle 26. It will be seen that this receptacle is connected with the one in front of it only by coil springs 27 which permit of considerable freedom of movement of the receptacle 26. As the device is moved along, the arms of the agitator bars 31 will engage the surface of the earth and periodically raise the receptacle 26 off the ground and permit it to drop with considerable force. This action in conjunction with the spring 27 will produce a lively agitation of the straw as it slides rearwardly over the surface of the perforated plate 28, and in this way all of the seeds remaining in the straw will be shaken therefrom through the plate 28 into the receptacle 26.

The pivoted extensions 48 of the reel arms are provided for the purpose of preventing the straw from being carried upwardly as it is discharged from the upper edge of the plate 21. At the time the reel arm reaches the point in its rotation at which the straw is discharged from the plate 21, the trip stop 59 will engage the finger 58 and disconnect the arm 54 from the shoulder 50, permitting the extensions 48 to drop backwardly, as shown in Figs. 2 and 3, to an angle from which any straw contacting with the cross-bar 49 will readily be discharged therefrom into the trough 23. Immediately after the reel arm has passed the tripping position, the cam rollers 45 will leave the cam grooves 37, and the springs 44 will move the arms into their retracted positions. As the reel continues to rotate and after the arms have passed their vertical position, the extensions 48 will fall by gravity into a position in which they are in alinement with the main portions of the reel arms and will be immediately locked in this position by the catch member 53 which is forced into place by the spring 55. Further rotation of the reel arm will cause the cam rollers 45 to again re-enter the cam groove 37, after which the operation will be repeated.

As shown in Fig. 1, the outer flange 30 of the cover plate for the rear receptacle 26 is inclined inwardly from the outer edge of the device. This is for the purpose of directing the straw away from the standing grass or grain so that a clearance will be provided for the wheel of the mower when the next cut is made.

It has heretofore been customary in the harvesting of many kinds of grasses which are used for hay to overlook the seed that is shattered from these grasses during the harvesting operation. In many cases the seed thus wasted exceeds the value of the entire crop of hay as has been demonstrated by the use of applicant's invention in the harvesting of such crops. The different varieties of clover, such as alfalfa, Lespedeza, and white clover, are conspicuous examples of crops of this character. It has heretofore been so difficult to collect the seeds which shatter from these crops during the harvesting operation that very little, if any, effort has been put forth along this line. With applicant's device, however, practically all of the seed which has heretofore been permitted to remain upon the ground is collected, and great savings thus accomplished.

I claim—

1. In combination, a device for severing plants from the surface of the ground, an upwardly inclined perforated plate positioned in the rear of said severing device and arranged to receive the plants severed thereby, a receiver for material passing through the perforations in said plate, means for moving said plants over the upper edge of said plate, and mechanism for causing said plant moving means to follow the contour of said plate to the upper edge thereof, and to continue past said edge in the same general direction in which it is moving at the time it reaches said edge.

2. In combination with a sickle for severing plants from the surface of the ground, a perforated plate for receiving the plants so severed, means for moving said plants in an unobstructed course to and over said plate, and means for agitating said plate to cause seeds to be separated thereby from said plants.

3. The combination with a sickle, of a screen positioned in the rear of said sickle for receiving plants that are cut thereby, means for moving said plants in an unobstructed course to and over said screen, means for agitating said screen, and a receptacle positioned beneath said screen.

4. The combination with a sickle, of a pair of screens located in the rear thereof, means for moving plants directly from said sickle to and over said screens in an unobstructed path, and receptacles for receiving material passing through said screens.

5. The combination with a sickle, of an upwardly inclined screen positioned in the rear thereof, a receptacle for receiving material sifted through said screen, and a second screen for receiving material discharged from said first screen and provided with a second receptacle movably connected with said first receptacle for receiving material passing through said second screen.

6. The combination with a mowing machine sickle, of an imperforate plate for receiving plants cut by said sickle, an upwardly inclined screen in the rear of said imperforate plate, and a downwardly inclined screen in the rear of said first-mentioned screen.

7. The combination with a sickle; of a table for receiving plants cut by said sickle, said table having an imperforate section adjacent said sickle, a perforated upwardly inclined section in the rear of said imperforate section, and a perforated downwardly inclined section in the rear of said upwardly inclined section; and means for receiving material sifted through said perforated sections.

8. The combination with a sickle, of an upwardly and rearwardly inclined screen in the rear of said sickle, a device for presenting plants to said sickle and moving plants severed by said sickle over the surface of said screen, and means for causing said moving device to follow the contour of said screen.

9. The combination with a sickle, of an upwardly inclined perforated table in the rear thereof, and a reel for moving plants cut by said sickle rearwardly over the upper surface of said table, said reel having extensible arms, and means for causing the outer ends of said arms to follow the contour of said screen.

10. In combination, a device for severing plants from the surface of the ground, a reel for presenting plants to said severing device, means for rotating said reel, said reel having radially extensible arms, and a cam for varying the length of said reel arms as said reel rotates upon its axis to control the path of movement of said reel arms toward said sickle.

11. In combination, a sickle, a reel for presenting plants to said sickle to be cut thereby, means for rotating said reel, said reel having extensible arms, resilient means normally tending to contract said arms, and means for forcing said arms outwardly at predetermined points in the rotation thereof.

12. In combination, a sickle, an upwardly curved table in the rear of said sickle, a reel arranged to coöperate with said sickle and having a minimum radius of rotation of less length than the radius of curvature of said table, and means for varying the path of movement of said reel arms from an arc of a circle as said arms approach said sickle and for extending the arms of said reel as they pass over the surface of said table to cause the outer extremities of said arms to follow the contour of said table.

13. In combination, a table for receiving plants severed from the earth, a reel for moving the plants over the surface of said table, means for rotating said reel, said reel having extensible arms provided with jointed extremities, a cam device for causing the extremities of said arms to follow the contour of the surface of said table during the rotation of said reel, means for holding the jointed extremities of said arms in fixed position during the movement thereof over the surface of said table, and means for permitting said extremities to assume an angular position relative to said arms as said extremities leave said table.

14. In combination, a device for severing growing plants from the surface of the earth, a receptacle positioned in the rear of said severing device, a screen connected with said receptacle in position to discharge material therethrough into said receptacle, means for directing plants cut by said severing device to said screen, and resilient means to cause said receptacle to be drawn forwardly by said severing device.

15. In combination, a sickle, a receptacle secured to said sickle in the rear thereof, a screen positioned above said receptacle and arranged to receive plants cut by said sickle, and means for agitating said receptacle and said screen as they are drawn over the surface of the ground in the rear of said sickle.

16. In combination, a sickle, a receptacle, resilient means for causing said receptacle to be drawn over the surface of the earth in the rear of said sickle, a screen positioned over said receptacle in position to receive plants severed by said sickle, and an agitator attached to said receptacle and having means to coöperate with the surface of the ground over which said receptacle is drawn by said sickle to cause a shaking movement of said receptacle and screen.

17. In combination, a sickle; an upwardly inclined table in the rear of said sickle for receiving plants cut thereby, said table having an imperforate section adjacent said sickle, a shoulder in the rear of said imperforate section, and a perforated section in the rear of said shoulder; a reel having extensible arms for presenting plants to said sickle and for moving said plants over the surface of said table after they have been cut by said sickle; a cam device for controlling the length of said arms to cause the extremities thereof to follow the contour of said table; jointed extensions on the ends of said arms; means for breaking the joints of said extensions to permit the plants to be readily discharged from the rear edge of said table; a receptacle for receiving seeds shattered from said plants and passing through the perforations in said table; a second downwardly and rearwardly inclined table in the rear of said first-mentioned table and arranged to receive the plants discharged from said first table, said second table having a perforated section, a receptacle arranged beneath said section, resilient means for securing said receptacle to said sickle to be drawn over the ground therewith, and an agitator arranged to engage the surface of the earth as said receptacle is drawn thereover and to impart a vibratory movement to said last-mentioned table and receptacle.

18. In combination, a table for receiving severed plants, a reel for moving said plants over the surface of said table the outer extremities of the arms of said reel being jointed, and means for permitting angular movement of said extremities to prevent said reel from carrying the severed plants upwardly away from said table.

In testimony whereof I have signed my name to this specification, on this 29th day of January A. D. 1917.

HERBERT M. RHODES.

Copies of this patent may be obtained for five cents each, by addressing the "Commissioner of Patents, Washington, D. C."